(12) United States Patent
Guo et al.

(10) Patent No.: US 12,026,366 B2
(45) Date of Patent: Jul. 2, 2024

(54) SYSTEM AND METHOD FOR COARSE AND FINE SELECTION KEYBOARD USER INTERFACES

(71) Applicant: Robert Bosch GmbH, Stuttgart (DE)

(72) Inventors: Jiajing Guo, Mountain View, CA (US); Nan Tian, Foster City, CA (US); Zhengyu Zhou, Fremont, CA (US); William Ma, Lagrangeville, NY (US); Nicholas Feffer, Stanford, CA (US); Marcellino Gemelli, Mountain View, CA (US)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 17/973,317

(22) Filed: Oct. 25, 2022

(65) Prior Publication Data

US 2024/0134516 A1     Apr. 25, 2024

(51) Int. Cl.
*G06F 3/04886* (2022.01)
*G06F 3/04842* (2022.01)
*G06T 19/00* (2011.01)

(52) U.S. Cl.
CPC ...... *G06F 3/04886* (2013.01); *G06F 3/04842* (2013.01); *G06T 19/00* (2013.01)

(58) Field of Classification Search
None
See application file for complete search history.

(56) References Cited

U.S. PATENT DOCUMENTS 8,484,573 B1   7/2013  Zhai et al.
10,275,023 B2  4/2019  McKenzie et al.
(Continued)

FOREIGN PATENT DOCUMENTS

IN    201941012248    10/2020

OTHER PUBLICATIONS

Website https://www.theverge.com/22197463/amazon-echo-frames-review-alexa Dieter Bohn, "Amazon Echo Frames review: listen to these specs Great in concept, but there's a limit to what Alexa can do on a phone." Dated Dec. 24, 2020, Retrieved Oct. 27, 2022, 12 Pages.
Jacob Devlin et al., "BERT: Pre-training of Deep Bidirectional Transformers for Language Understanding." Proceedings of NAACL-HLT 2019, pp. 4171-4186.
(Continued)

*Primary Examiner* — William L Bashore
*Assistant Examiner* — Gabriel Mercado
(74) *Attorney, Agent, or Firm* — Dickinson Wright PLLC

(57) ABSTRACT

A system including a user interface that includes a processor in communication with a display and an input interface, the processor programmed to output on the display the user interface including a keyboard layout, wherein the keyboard layout includes at least a keyboard includes a collection of characters, in response to a first input from the input interface, output a first portion of the keyboard layout associated with a first subset of characters of the keyboard layout, wherein the first subset does not include all of the characters, in response to a second input from the input interface, select a second subset of characters, wherein the second subset of characters is from and include less characters than the first subset of characters and the second subset includes two or more characters, and output a character on a text field associated with the user interface based on the selection of the second subset.

19 Claims, 8 Drawing Sheets

(56) References Cited

U.S. PATENT DOCUMENTS

| | | | |
|---|---|---|---|
| 2006/0125659 A1* | 6/2006 | Kim | G06F 3/015 |
| | | | 341/20 |
| 2008/0140307 A1* | 6/2008 | Chen | G06F 3/04886 |
| | | | 701/532 |
| 2008/0195940 A1 | 8/2008 | Gail et al. | |
| 2010/0171700 A1* | 7/2010 | Sharan | G06F 3/0237 |
| | | | 345/161 |
| 2012/0029910 A1 | 2/2012 | Medlock et al. | |
| 2015/0364140 A1 | 12/2015 | Thörn | |
| 2016/0048223 A1* | 2/2016 | Taguchi | G06F 3/0346 |
| | | | 345/157 |
| 2016/0132233 A1* | 5/2016 | Ghassabian | G06F 3/04886 |
| | | | 715/773 |
| 2017/0293402 A1 | 10/2017 | Morris et al. | |
| 2019/0034405 A1 | 1/2019 | Ivan et al. | |
| 2019/0362557 A1 | 11/2019 | Lacey et al. | |
| 2020/0106726 A1* | 4/2020 | Pham | G06F 40/56 |
| 2021/0074277 A1 | 3/2021 | Lewis | |

OTHER PUBLICATIONS

Lik Hang Lee et al., "HIBEY: Hide the Keyboard in Augmented Reality." 2019 IEEE International Conference on Pervasive Computing and Communications (PerCom, Mar. 2019, 11 Pages.

Wenge Xu et al., "Pointing and Selection Methods for Text Entry in Augmented Reality Head-Mounted Displays." 2019 IEEE International Symposium on Mixed and Augmented Reality (ISMAR), pp. 279-288.

Xueshi Lu et al., "iText: Hands-free Text Entry on an Imaginary Keyboard for Augmented Reality Systems." The 34th Annual ACM Symposium on User Interface Software and Technology, Virtual Event, USA, Oct. 2021, pp. 815-825.

Jacqui Fashimpaur et al., "PinchType: Text Entry for Virtual and Augmented Reality Using Comfortable Thumb to Fingertip Pinches." CHI EA 2020: Extended Abstracts of the 2020 CHI Conference on Human Factors in Computing Systems Apr. 2020, pp. 1-7.

Dan Jurafsky et al., Speech and Language Processing Online book 2021, Chapter 3, N-gram Language Models., Retrieved Oct. 27, 2022, 29 Pages.

* cited by examiner

SYSTEM AND METHOD FOR COARSE AND FINE SELECTION KEYBOARD USER INTERFACES

TECHNICAL FIELD

The present disclosure relates to an interface layout, including a keyboard layout for an augmented reality (AR) or virtual reality (VR) environment.

BACKGROUND

As AR and VR technologies have been gradually adopted for work and social interaction, text entry becomes an increasingly important feature. In the state-of-art AR or VR devices, such as HoloLens, users usually need to perform pinch gestures to select characters on a mid-air keyboard. Such designs have drawbacks. First, the text entry speed is slow in such kind of interaction without a physical keyboard. Second, the accuracy of typing is impeded by limited accuracy of sensors, such as hand tracking. Another drawback may be that hands may be occupied with other tasks and not available for text entry.

To solve the problems above, text entry approaches that involve multiple techniques and devices have been proposed. For example, hands-free typing can track users' eye movement and blinking have been proposed. The Inertial measurement unit (IMU) in the device can track users' head movement in another embodiment. External devices include a ray-casting controller that help users point and select, or a mobile device with a touch screen where users can swipe and select.

The methods above mostly focus on the interaction, but the keyboards are mostly standard QWERTY keyboards. Some other solutions changed the keyboard layout or interaction approach. HIBEY may arrange the 26 letters and special characters on a horizontal line in alphabetic order. Users may select words via grabbing the intended letter. In one example, "PinchType" may divide the keyboard into three groups and let users choose by pinching with thumb and fingertips.

SUMMARY

A first embodiment discloses, a system including a user interface that includes a processor in communication with a display and an input interface, the processor programmed to output on the display the user interface including a keyboard layout, wherein the keyboard layout includes at least a keyboard includes a collection of characters, in response to a first input from the input interface, output a first portion of the keyboard layout associated with a first subset of characters of the keyboard layout, wherein the first subset does not include all of the characters, in response to a second input from the input interface, select a second subset of characters, wherein the second subset of characters is from and include less characters than the first subset of characters and the second subset includes two or more characters, and output a character on a text field associated with the user interface based on the selection of the second subset.

A second embodiment discloses, a virtual reality apparatus includes a display configured to output a user interface, an input interface, a processor in communication with a display and the input interface, the processor programmed to output on the display the user interface including a keyboard layout, wherein the keyboard layout includes at least a keyboard includes a collection of characters, in response to a first input from the input interface, highlight at the display a first portion of the keyboard layout associated with a first subset of characters of the keyboard layout, wherein the first subset does not include all of the character input, in response to a second input from the input interface, highlight a second subset of characters, wherein the second subset of characters includes between two and four remaining characters from the first subset, and select and output at the display the second subset of characters.

A third embodiment discloses a user interface that includes a text field section, a suggestion field section, wherein the suggestion field section is configured to display predicted words in response to contextual information associated with the user interface, a keyboard layout, wherein the keyboard layout includes at least a keyboard includes a collection of characters configured to display at the text field section in response to receiving input from an input interface, wherein the user interface is configured to in response to a first input from a first input interface, output a first portion of the keyboard layout associated with a first subset of characters of the keyboard layout and shade-out remaining characters from the collection of characters, wherein the first subset does not include all of the characters, in response to a second input from a second input interface, select and highlight a second subset of characters from the first portion and output one or more predicted words at the text field section, wherein the second subset of characters are from the first subset but does not include all of the characters of the first subset.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The above two directions of ideas, involve multiple sensors or devices, and design new keyboard input approach, can be combined. The system below proposes a "Coarse-n-Fine" layout, a new keyboard input method that requires a two-step selection and can be used with multiple input sensor data such as eye-tracking and controllers.

Figure 1:
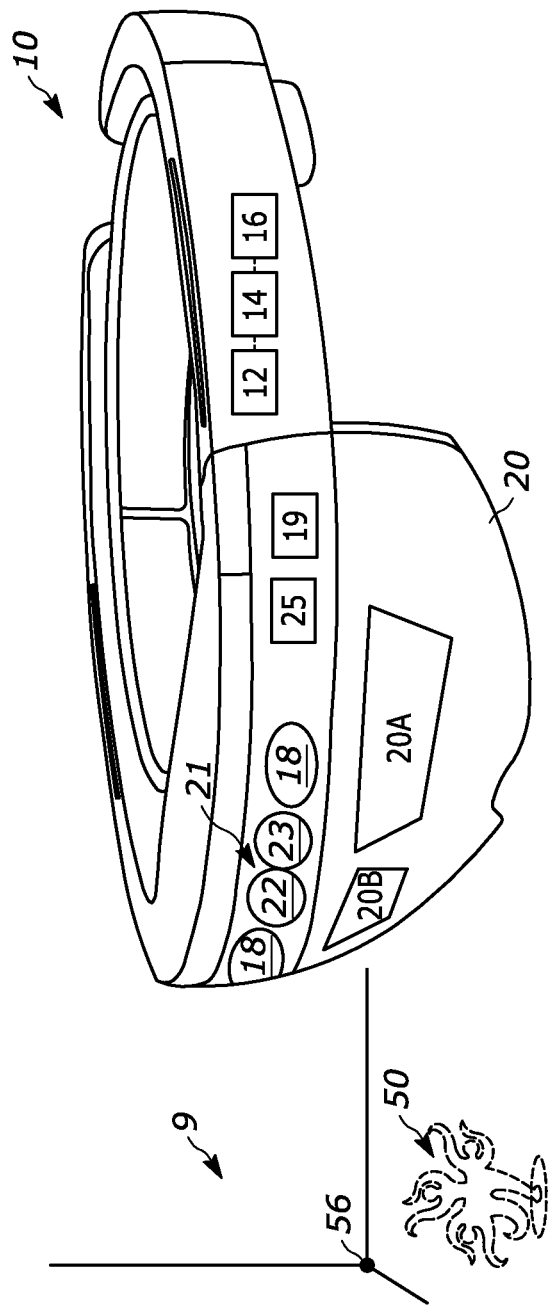
FIG. 1 shows a computing device in the form of a head-mounted display device, according to an example embodiment of the present disclosure.

This disclosure include an embodiment of a coarse keyboard and a fine keyboard (e.g., sometimes called a "Coarse-n-Fine keyboard") where users perform a two-step selection when there is limited input sensor accuracy and limited interactions. The keyboard may be divided into "coarse" and "fine" areas based on a traditional keyboard, e.g., QWERTY keyboard. In one non-limiting example described in this disclosure, a user may first select the "coarse" area that include three columns of letters on a QWERTY keyboard. Next, the user may select the "fine" column of the intended input letter. For the selection process, the system may propose multiple interaction methods for character and/or word selection, such as the combinations of eye tracking, on-device IMU, mobile device, controller, and/or controller on a mobile device, etc. Based on the user's input selection of letters, the algorithm may suggest one or more words to output as a suggestion. The suggested words can be generated from a vocabulary, a language model, or contextual information. The Coarse-n-Fine keyboard requires limited number of options, can handle limited accuracy of input sensor data and has equivalent performance with other mixed-reality keyboards. Thus, the Coarse-n-Fine keyboard may be a novel text-entry method that allows a user to enter words and sentences when the degrees of interaction are limited. The invention includes two parts, FIG. 1 illustrates a computing device 10 in the form of a head mounted display device 10, according to one embodiment of the present disclosure, which has been conceived to address the issues discussed above. As shown, the computing device 10 includes processor 12, volatile storage device 14, non-volatile storage device 16, cameras 18, display 20, active depth camera 21. The processor 12 is configured to execute software programs stored in non-volatile storage device 16 using portions of volatile storage device 14 to perform the various functions recited herein. In one example, the processor 12, volatile storage device 14, and non-volatile storage device 16 may be included in a system-on-chip configuration included in the head mounted display device 10. It will be appreciated that the computing device 10 may also take the form of other types of mobile computing devices, such as, for example, a smartphone device, a tablet device, a laptop, a machine vision processing unit for an autonomous vehicle, robot, drone, or other types of autonomous devices, etc. In the systems described herein, devices in the form of computing device 10 may be utilized as a first display device and/or a second display device. Thus, the device may include a virtual reality device, augmented reality device, or any combination therefore. The device may include a virtual keyboard as well.

Display 20 is configured to be at least partially see-through, and includes right and left display regions 20A, 20B which are configured to display different images to each eye of the user. The display may be a virtual reality or augmented reality display. By controlling the images displayed on these right and left display regions 20A, 20B, a hologram 50 may be displayed in a manner so as to appear to the eyes of the user to be positioned at a distance from the user within the physical environment 9. As used herein, a hologram is an image formed by displaying left and right images on respective left and right near-eye displays that appears due to stereoscopic effects to be positioned at a distance from the user. Typically, holograms are anchored to the map of the physical environment by virtual anchors 56, which are placed within the map according to their coordinates. These anchors are world-locked, and the holograms are configured to be displayed in a location that is computed relative to the anchor. The anchors may be placed in any location, but are often placed in positions at locations where features exist that are recognizable via machine vision techniques. Typically, the holograms are positioned within a predetermined distance from the anchors, such as within 3 meters in one particular example.

In the configuration illustrated in FIG. 1, a plurality of cameras 18 are provided on the computing device 10 and are configured to capture images of the surrounding physical environment of the computing device 10. In one embodiment, four cameras 18 are provided, although the precise number of cameras 18 may vary. The raw images from the cameras 18 may be stitched together with perspective correction to form a 360 degree view of the physical environment, in some configurations. Typically, cameras 18 are visible light cameras. Images from two or more of the cameras 18 may be compared to provide an estimate of depth, using passive stereo depth estimation techniques.

In addition to visible light cameras 18, a depth camera 21 may be provided that uses an active non-visible light illuminator 23 and non-visible light sensor 22 to emit light in a phased or gated manner and estimate depth using time-of-flight techniques, or to emit light in structured patterns and estimate depth using structured light techniques.

Computing device 10 also typically includes a six degree of freedom inertial motion unit 19 that includes accelerometers, gyroscopes, and possibly magnetometers configured to measure the position of the computing device in six degrees of freedom, namely x, y, z, pitch, roll and yaw.

Data captured by the visible light cameras 18, the depth camera 21, and the inertial motion unit 19 can be used to perform simultaneous location and mapping (SLAM) within the physical environment 9, to thereby produce a map of the physical environment including a mesh of reconstructed surfaces, and to locate the computing device 10 within the map of the physical environment 9. The location of the computing device 10 is computed in six degrees of freedom, which is important to displaying world-locked holograms 50 on the at least partially see through display 20. Without an accurate identification of the position and orientation of the computing device 10, holograms 50 that are displayed on the display 20 may appear to slightly move or vibrate relative to the physical environment, when they should remain in place, in a world-locked position. This data is also useful in relocating the computing device 10 when it is turned on, a process which involves ascertaining its position within the map of the physical environment, and loading in appropriate data from non-volatile memory to volatile memory to display holograms 50 located within the physical environment.

The IMU 19 measures the position and orientation of the computing device 10 in six degrees of freedom, and also measures the accelerations and rotational velocities. These values can be recorded as a pose graph to aid in tracking the display device 10. Accordingly, even when there are few visual cues to enable visual tracking, in poorly lighted areas or texture-less environments for example, accelerometers and gyroscopes can still enable spatial tracking by the display device 10 in the absence of visual tracking. Other components in the display device 10 may include and are not limited to speakers, microphones, gravity sensors, Wi-Fi sensors, temperature sensors, touch sensors, biometric sensors, other image sensors, eye-gaze detection systems, energy-storage components (e.g. battery), a communication facility, etc.

In one example, the system may utilize an eye sensor, a head orientation sensor or other types of sensors and systems to focus on visual pursuit, nystagmus, vergence, eyelid closure, or focused position of the eyes. The eye sensor may include a camera that can sense vertical and horizontal movement of at least one eye. There may be a head orientation sensors that senses pitch and yaw. The system may utilize a Fourier transform to generate a vertical gain signal and a horizontal gain signal.

The system may include a brain wave sensor for detecting the state of the user's brain wave and a heart rate sensor for sensing the heart rate of the user. The brain wave sensor may be embodied as a band so as to be in contact with a head part of a user, or may be included as a separate component in a headphone or other type of device. The heart rate sensor may be implemented as a band to be attached to the body of a user so as to check the heart rate of the user, or may be implemented as a conventional electrode attached to the chest. The brain wave sensor 400 and the heartbeat sensor 500 calculate the current brain wave state and the heart rate of the user so that the controller can determine the order of the brain wave induction and the speed of the reproduced audio according to the current brain wave state or heart rate of the user. And provides the information to the control unit 200.

The system may include an eye tracking system. The head mounted display device (HMD) may collect raw eye movement data from at least one camera. The system and method may utilize the data to determine the location of the occupant's eyes. The system and method may determine eye location to determine the line of sight of the occupant.

The system thus includes a multitude of modalities to utilize as an input interface connected to the system. The input interface may allow a user to control certain visual interfaces or graphical user interfaces. For example, the input interface may include buttons, controllers, joy sticks, mouse, or user movement. In one example, a head nod left may move a cursor left, or a head nod right may move a cursor right. The IMU 19 may be utilized to gauge the various movement.

Figure 2:
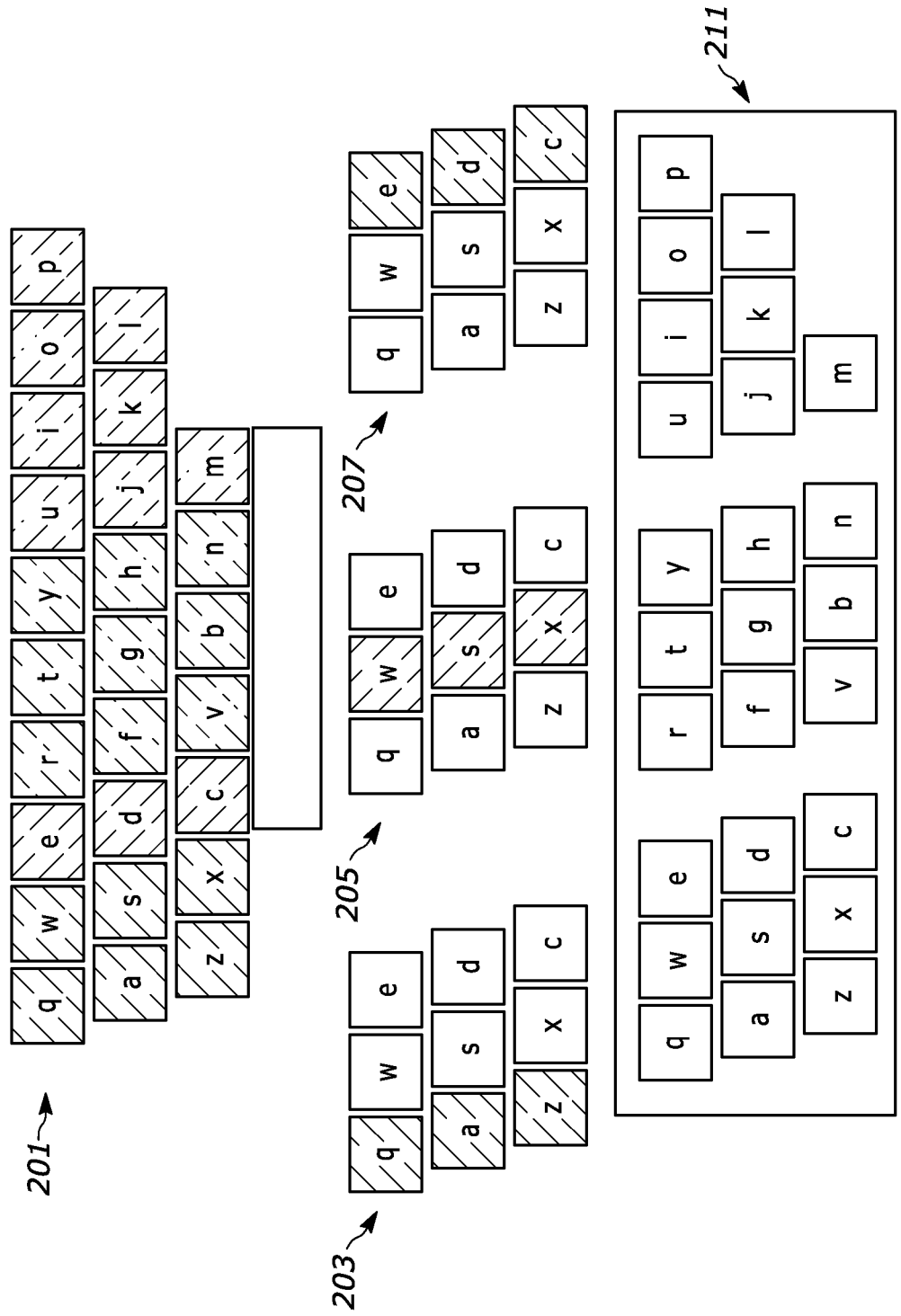
FIG. 2 illustrates an example keyboard layout of an interface.

FIG. 2 illustrates an example keyboard layout of an interface. As it shows in FIG. 2, the system may divide the QWERTY keyboard into 3 sections, left section 203; middle section 205; and a right section 207, which may be large areas for the user to interact with in coarse selections. The three coarse areas may be sub sequentially divided into additional three sections, such as a left-middle-right subsections. However, any group of characters and any subsection may be utilized. In one example, one such Coarse-n-Fine grouping for English is to have the coarse groups be collections of three fine groups from left to right across the keyboard ({qaz, wsx, edc} group 203, {rfv, tgb, yhn} group 205, {ujm, ik, olp} group 207), and to have each of the columns of the QWERTY keyboard be its own fine group, such as for example (qaz, wsx, edc, rfv, tgb, yhn, ujm, ik, olp). Thus, each group may include a subset of columns.

The user may enter a letter of a word by first selecting the coarse group and then the fine group the letter belongs to. For example, if a user wants to type "h," the coarse group is selected, the fine group is right. Thus, a user may make two selections for each letter input under an embodiment of the disclosure.

Because each fine group may be associated to a coarse group, selecting a coarse group narrows the selection space for the fine group. Thus, the fine group may be a subset associated with the coarse group subset. With the example grouping, selecting each fine group individually may require nine options (e.g., such as a T9 keyboard), whereas selecting a coarse and fine group requires six options: three for selecting the coarse group and three more for selecting the fine group within the selected coarse group in one embodiment. This is may be advantageous when the degrees of interaction are limited, such as when there is limited space on a physical controller. The spacing between the coarse sections and the size of the keyboard (distance from user) can also adjusted by the user to fit their preferences. Thus, layout 211 is an embodiment of an alternative keyboard layout.

Users can use a single device to perform the letter selection in one embodiment. In another embodiment, the user may also use multiple devices such as controllers, buttons, joysticks, and trackpad to make a selection.

Figure 3A:
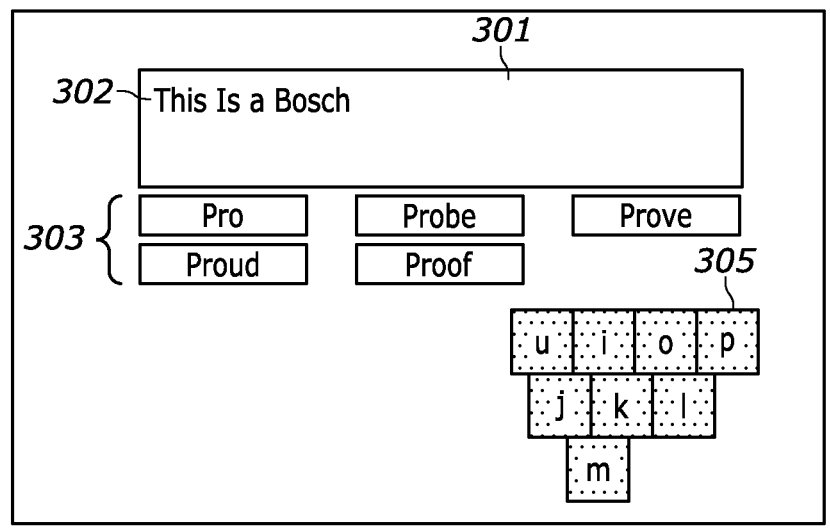
FIG. 3A illustrates a selection of a first subset with a coarse area selection.

FIG. 3A discloses a selection of a coarse area. For example, the user may gaze at the middle coarse area. The eye tracking on the HMD detects such a selection and then highlights the area 305. The eye tracking on HMD may detect such selection and highlighted the area. Highlighting may include changing a color, style, size (e.g., increasing size/decreasing size), italicizing, bolding, or any other item. While shading may be utilized to minimize the non-relevant portion of the keyboard, other styles may be utilized. These may include a change color, style, size (e.g., increasing size/decreasing size), shading, italicizing, bolding, or any other item.

Figure 3B:
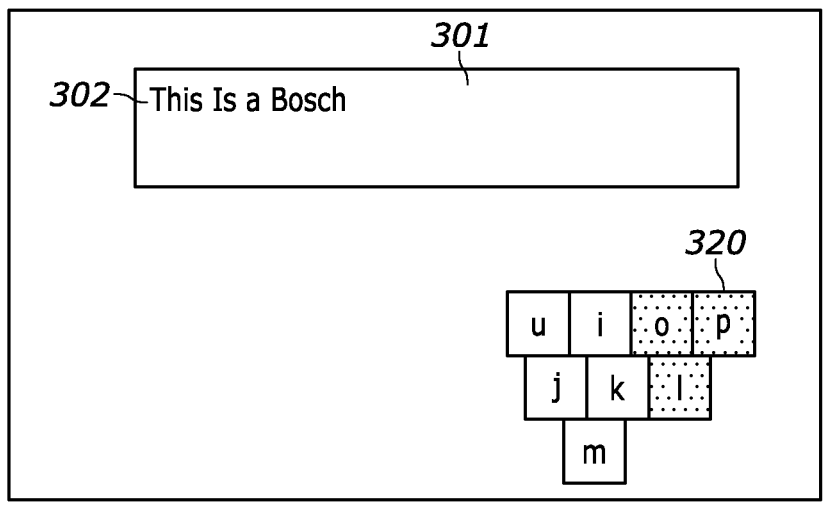
FIG. 3B illustrates a selection of a second subset with a fine area selection.

FIG. 3B discloses an example of an interface in response to the user input. For example, if the user then tilts their head towards the right, it can perform a fine selection. As shown, the letter "o" "p" and "1" may be highlighted for selection. In the inverse, the letters "u" "i" "j" "k" and "m" may be toned down. In another example, a user may first gaze at the middle coarse area. The user may then tilts the head towards right to perform the fine selection, as shown. In one embodiment, if the HMD does not have eye tracking, the coarse and fine selections may be done solely by a mobile device. Taking a joystick as an example, a user may first click the middle of the keyboard to select the middle coarse area, and then the user may push to the right to perform the fine selection.

The final selection of the "fine" selection may be a group of three or two characters, but can be any amount of characters (e.g., four characters or five characters). In one example, the "coarse" selection may mean a selection among three regions (e.g., left, middle, and right regions). Next, once a region of the coarse selection is selected, the "fine" selection may go ahead to select a row in the selected region. There may be three rows in each region. For example, "e,d,c" is the right row of the left region. Note that in right region, the three rows may be "u,j,m", "I,k", and "o,l,p",respectively.

The system will accordingly list possible words in the word list section on the screen (the possible words may be selected based on the language model). In most cases, the user may see the suggested/predicted word e.g., the word he/she intends to input) in the word list, and select it. For example, if the user wants to input "we", the user may only need to select the row "w,s,x" and "e,d,c", and the interface may output the word "we" in the suggestion section to be selected. Thus, the system may predict a word based on a selection of a group of characters (e.g., not a single character). This may include a group of two or three characters, for example.

In another example, in a situation that the user cannot find the wanted word in the word list, the user can switch to the three-step input method, which uses an additional step after step2 above to select one character, i.e., explicitly tells system which character to choose in a row.

Figure 4:
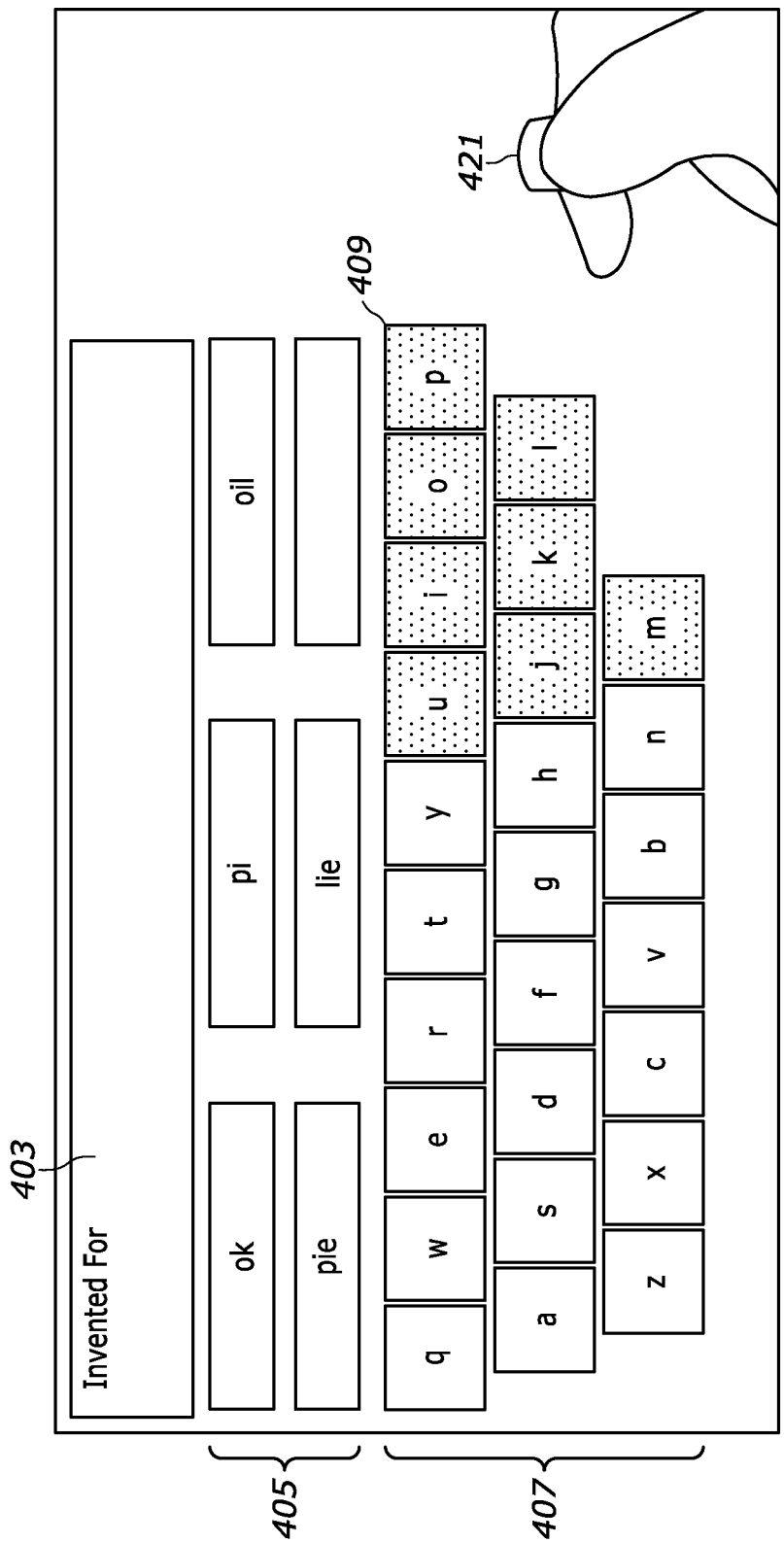
FIG. 4 illustrates an example of a virtual interface in use.

FIG. 4 illustrates an example of a virtual interface in use. The virtual interface may include a text field 403. Users can also select through multiple devices. For example, a user first gazes at the middle coarse area, then she swipes right to perform the fine selection (FIG. 3). The fine selection 409 may include a limited subset of characters of the keyboard, such as 8 characters as shown in FIG. 4. Furthermore, the interface may include a word suggestion field 405. As discussed further below, the word suggestions 405 (e.g., "OK", "pie", "pi", "lie", "oil") may be based off the previous input in the text field, such as "invented for" in the figure below.

The input interface may include mobile devices include but are not limited to controllers, joysticks, buttons, rings, eye-tracking sensors, motion sensors, physiological sensors, neuro sensors, and trackpads. Table 1 is the combination of multi-device interaction. Hand gesture and head gesture can also be used in Coarse-n-Fine keyboard. Table 1 is shown below:

| Type | Coarse selection | Fine selection |
| --- | --- | --- |
| Single device | Eye tracking on HMD | IMU on HMD |
| Multi-device | Eye tracking on HMD | IMU on Mobile device |
| Multi-device | Eye tracking on HMD | Signal on mobile device |
| Single device | Signal on mobile device | Signal on mobile device |
| No device | Eye tracking on HMD | Hand gesture/head gesture |

While Table 1 is one example, any modality may be utilized for a first coarse selection and any modality may be utilized for any fine selection. For example, a remote control device may be utilized for the coarse selection and the fine selection. Furthermore, the same or different modalities may be utilized for either selection or for both selections.

Figure 5:
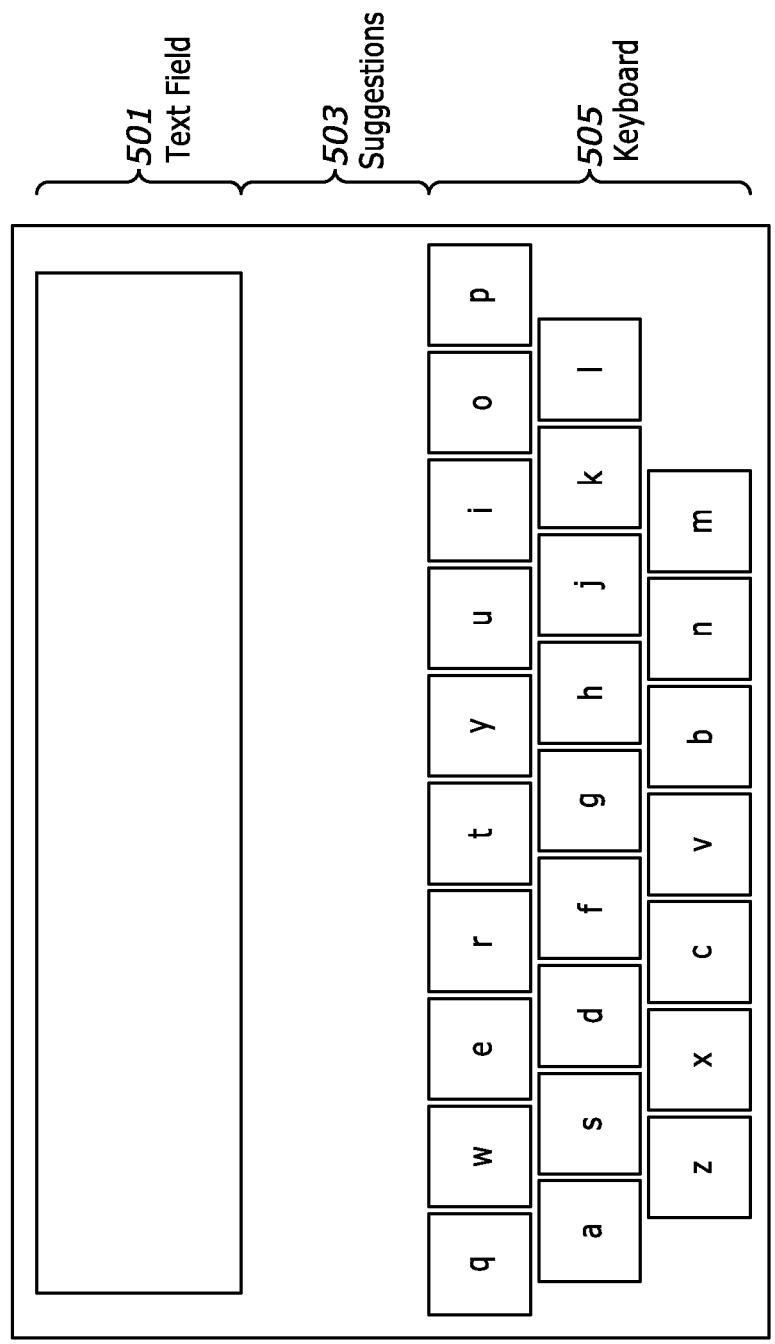
FIG. 5 discloses an interface for word suggestions.

FIG. 5 discloses an embodiment of a user interface for word suggestions. The interface may include a text field 501, suggestion field 503, and keyboard interface 505. The word that the user is attempting to enter may be ambiguous because each fine group contains multiple letters. A user may need to perform word level selection. The system may propose a word suggestion component on the typing interface. The system may put the word suggestion component in between the text entry field and the keyboard. The system may also divide the same three coarse sections that can be triggered by the same coarse selection interaction methods while typing. A second fine selection may also used, but instead of left-middle-right, fine selections, word selection may be done by up-down fine selections to differentiate word selection from character 3-gram selections. Of course, any number of fine selections may be used.

Figure 6:
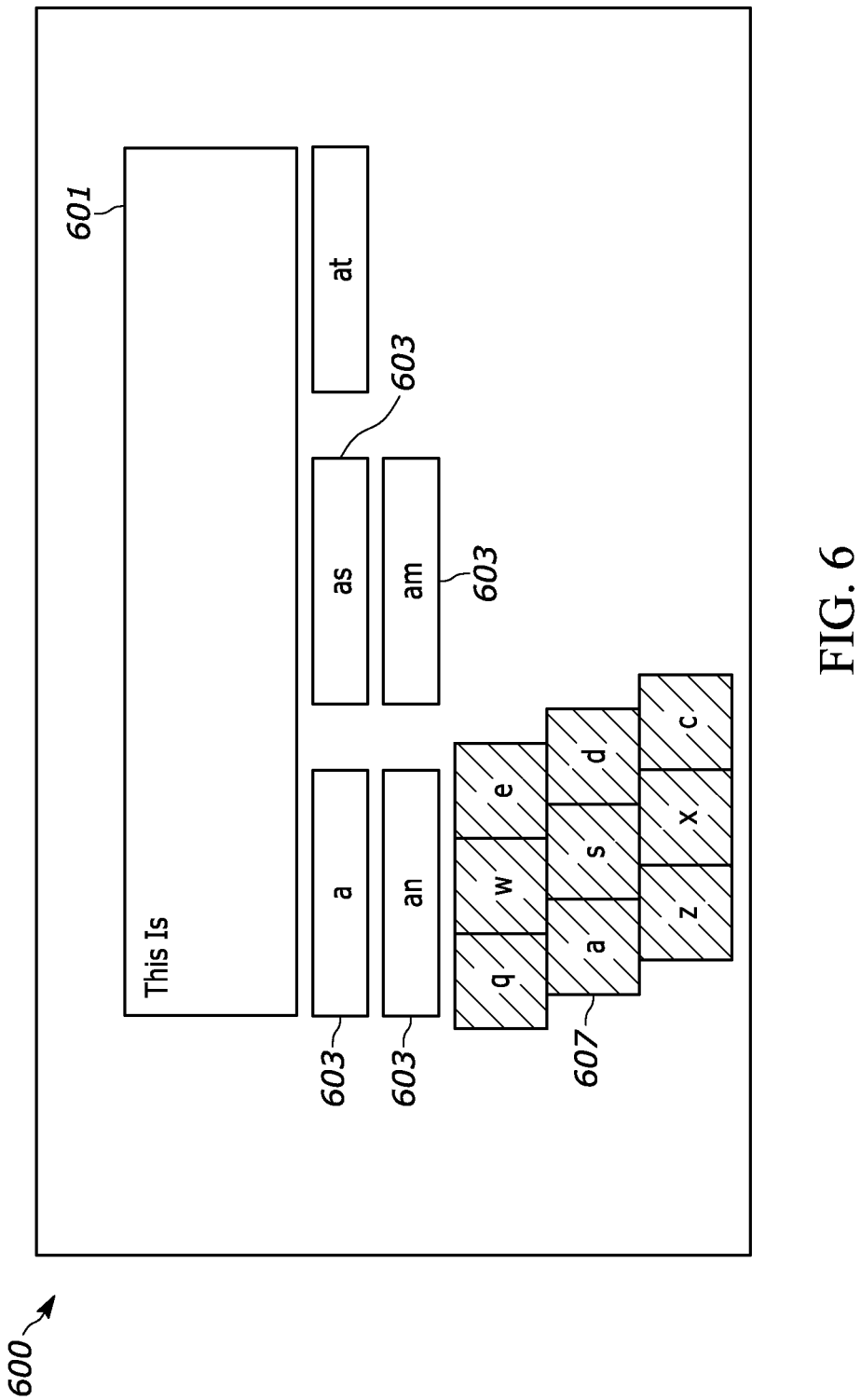
FIG. 6 illustrates an embodiment of a word suggestion on an interface.

FIG. 6 illustrates an embodiment of a word suggestion on an interface. Such an example may include a variety of methods that can be employed to offer word suggestions. The system may include a virtual interface 600. The interface may include a text field 601 where letters and words are presented before being utilized as input/output. In one example, we may suggest predicted words 603 based on the previous input. The system may utilize a language model (LM) that is a model that estimates the probability distribution over words given text context. For example, after the user inputs one or more words, a language model can be used to estimate the probability of a word occurring as the next word.

One of the simplest LM may be the n-gram model. An n-gram is a sequence of n words. For example, a bigram may be a two-word sequence of words like "please turn", "turn your", or "your homework", and a trigram maybe a three-word sequence of words like "please turn your", or "turn your homework". After trained on text corpora (or a similar model), an n-gram model can predict the probability of the next word given the previous n–1 words. More advanced language models, such as pre-trained neural-network based models, may be applied to generate better probability estimation of the next word based on longer word history (e.g., based on all the previous words).

In one disclosure, leveraging certain language models, the system can predict the next word given the existing input and the characters. As FIG. 6 shows, after a user typed "is" and selected the left area/region 607, the system may suggest a list of words "a", "as", "at" because they are likely to be the next word. Thus, simply selecting a word may reduce the steps of typing out a word. The system may also be able to provide a suggestion based on contextual information, such as time of the day, address book, emails, text messages, chat history, browser history, etc. For example, if a user wants to reply to a message and type "I'm in meeting room 303." The device may detect the user's location and prompt "303: after the user types "meeting room."

Figure 7A:
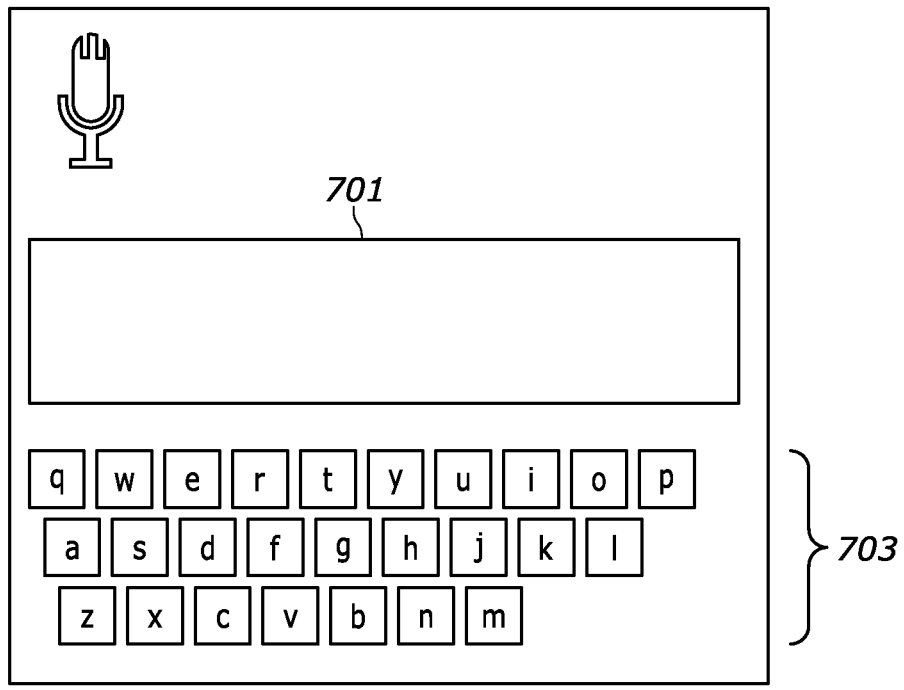
FIG. 7A illustrates an embodiment of a user interface showing a microphone icon and virtual keyboard with an empty text field.

FIG. 7A discloses an embodiment of a user interface showing a microphone icon and virtual keyboard with an empty text field. For each of the three steps, multiple methods may be provided for a user to choose. In the first step, any method (e.g., virtual-keyboard based text inputting, speech based inputting, finger/hand motion based inputting) that allows the user to input text sentences and display the inputted sentence on the virtual/augmented reality device can be included into the system as one supported sentence-input method for user to choose. In such an implementation, a virtual-keyboard based input method and a speech based input method may be provided. The virtual-keyboard based input method can be implemented in various ways. In such an embodiment, the system may utilize a "Coarse" and "Fine" virtual keyboard for text inputting. For the speech based input method, the user can input the text sentence(s) by simply saying the sentence(s). The speech signal may be collected by the microphone associated with the virtual/augmented reality device, and then processed by an on-premises or cloud-based Automatic Speech Recognition (ASR) engine. The recognized text sentence(s) (e.g., ASR result) will then be displayed (shown to the user) on the display interface of the virtual/augmented reality device. The user may choose the virtual-keyboard based input method or the speech based input method through various ways. In one implementation, we display a microphone icon above the virtual keyboard on the display of the virtual/augmented reality device, as shown in FIG. 1, and the method selection can be done by eye gaze. The user can select the speech based input method by looking at the microphone icon, or select the virtual-keyboard based input method by looking at the virtual keyboard region displayed. In other implementations, gesture, button selection, etc., can also be used to select among the two methods.

FIG. 7A may include a text field 701 that shows given text that is input by either the keyboard 703 or another modality, such as a microphone/speech input. The system may display a microphone icon and virtual keyboard for a user to choose either the speech based on a virtual-keyboard input method or by eye gaze. For example, the text field may receive characters or sentences from input utilizing a keyboard 703 that can be controlled through a multitude of input interfaces, such as a touch screen, mobile device, eye gaze, virtual keyboard, controller/joystick. In another embodiment, the text field 701 may receive input utilizing voice recognition input from a microphone and utilizing a VR engine.

Figure 7B:
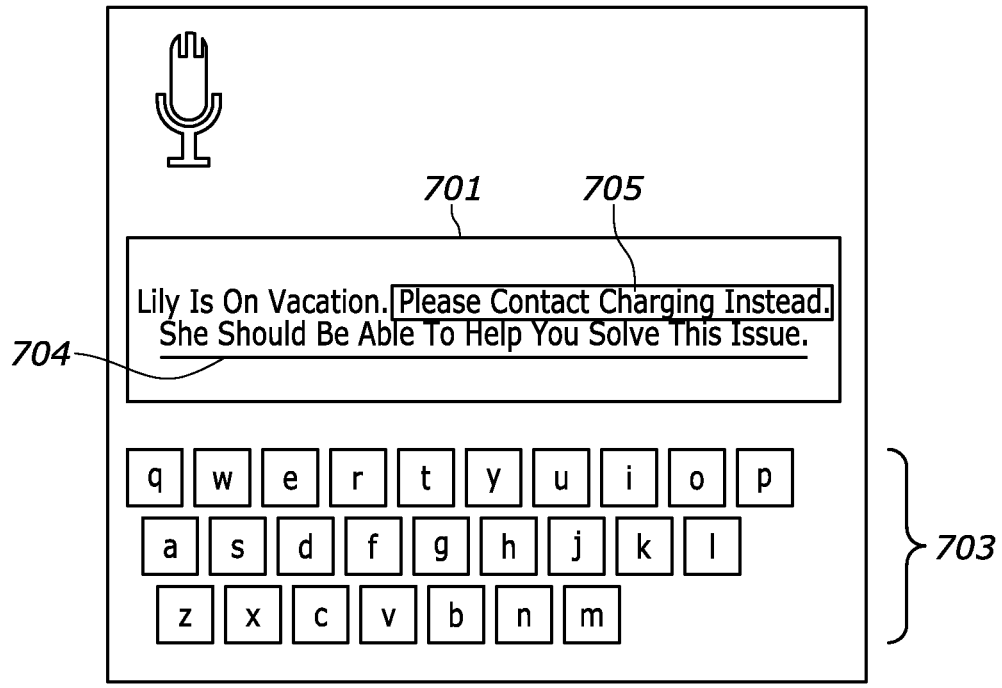
FIG. 7B illustrates an embodiment of a user interface showing a microphone icon and virtual keyboard with an input sentence.

FIG. 7B discloses an embodiment of a user interface showing a microphone icon and virtual keyboard with an input sentence. The interface may include a text field 701 that shows given text that is input by either the keyboard 703 or another modality, such as a microphone/speech input. However, the system may include text or characters 704 in the text field 701, as opposed to being empty in FIG. 7A. Thus, a next step may be for the user to input the text 704 via a first modality, which may include any type of interface (e.g., speech, voice, virtual keyboard, joystick, eye gaze, etc.). In the second step, the inputted sentence(s) 704 shown on the display of the virtual/augmented reality device, the user may select a word to edit (e.g., edit word 705) by multiple possible ways or modalities, and the selected word 705 may be highlighted on the display for further processing later. In one implementation, the user may utilize an eye gaze to capture which sentence or word the user may be interested in editing. If the user looks at one sentence for a time period longer than a threshold time period (e.g., threshold A), the system may switch to the editing mode. The threshold time may be any time period, e.g., one second, two seconds, three second, etc.). The sentence that the user is looking at will be emphasized with a block (as shown in FIG. 7B), and the word in the middle of the sentence will be automatically highlighted 705. The user can then use the left/right gesture or press the left/right button on a hand-held device (e.g., controller/joystick) or a virtual input interface to switch the highlighted region to the word on the left/right in the focused sentence. The user may continuously move the highlighted region left/right until the target word to edit is highlighted.

When a word is highlighted longer than a threshold time (e.g. threshold time B), the word may be viewed as the selected word to edit. Thus, the system may allow for a further step to edit that word (e.g., either selecting a suggested or manually inputting the words) and allow for another step that allows for such editing. In one example, once the editing is done for that word, the edited word may remain highlighted, and the user may use left/right gesture/button to move to the next word to edit. If no gesture or button pressing is detected for a time period longer than a third threshold or time-out (e.g. time threshold C), the editing task is considered completed. In another implementation, the system may directly utilize eye gazing of the user to select/highlight each word to edit by simply looking at the word for a time period longer than a fourth threshold (e.g. threshold D).

Figure 7C:
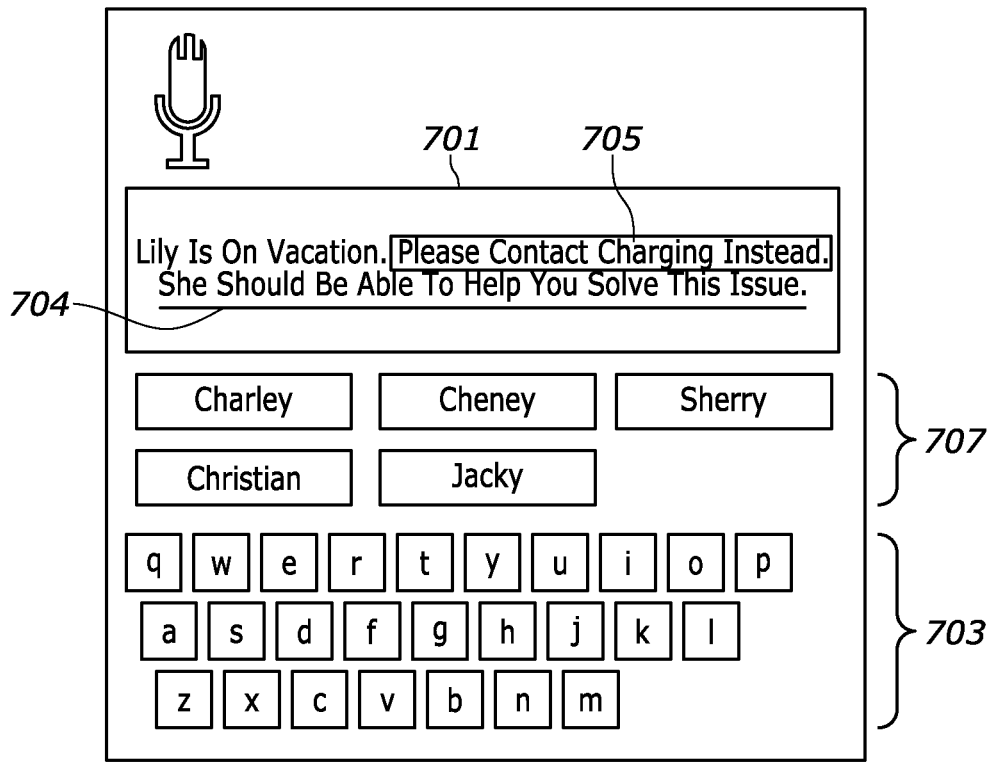
FIG. 7C illustrates an embodiment of a user interface showing suggested words and potential editing of a sentence utilizing the suggested words.
Figure 7D:
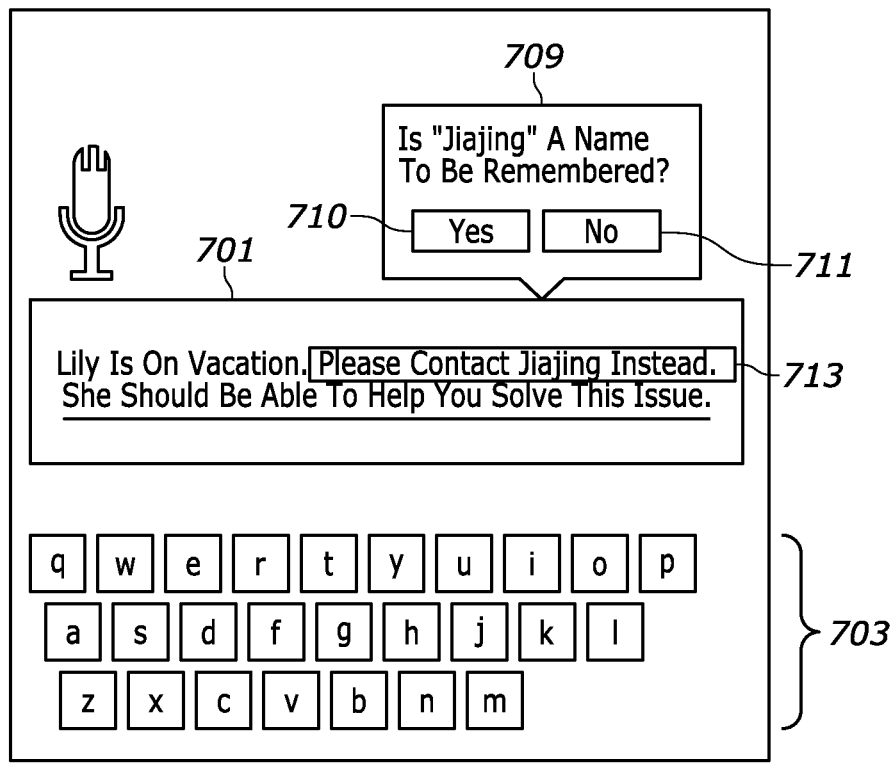
FIG. 7D illustrates an embodiment of a user interface including a pop-up interface.

FIG. 7C discloses an embodiment of a user interface showing suggested words and editing of a sentence utilizing the suggested words. During individual word editing, the system may proceed to enable the editing functions for a user to use. Once a word to edit (e.g., the highlighted word) is determined, the system (optionally) may first generate a list of alternative high-probability words, which are calculated/ranked with the aid of certain language model (e.g., n-gram language model, BERT, GPT2, etc.) based on the sentence context as well as other available knowledge (e.g., speech features if the sentence is input by speech), and this list is shown in a region of the display of the virtual/augmented reality device, as shown in FIG. 7D. If the user sees the desired word in the list of alternatives, he/she may directly select this word as the editing result for the word to edit. The selection of the desired word in the list can be done in multiple possible ways. In one example, once the user looks at the region of the list of alternative words, the first word in the list (e.g., the one with the highest probability based on the sentence context) may be highlighted. The user can then use either a gesture or button to move the highlighting to the desired word in a similar manner as described above and with respect to FIG. 7B. If a word in the list of alternatives is highlighted for a time period longer than a threshold time (e.g., threshold time E), the highlighted word will be viewed as the editing result and selected. Thus, this may be selected for the threshold time period by any modal (e.g., eye gazing, joy-stick, etc.). The system may then update the text sentence with the editing result accordingly, and the correction/editing of the focused word may be considered done. Note that during this procedure, whenever the user moves his/her eye gaze outside of the region of the list of alternatives, the highlight maybe be hidden and may be reactivated later once the users looks back to this region.

FIG. 7D discloses an embodiment of a user interface including a pop-up interface. The pop-up window 709 may include an option that asks to remember the corrected/suggested word. The user may accept the option via first interface 710 or decline the option via second interface 711. Thus, as shown in FIG. 7C, the system may add the word "Jiajing" if the user selects the "YES" 710 option. If the user selects "NO" 711 option, then it will not remember it. The system may then coordinate the added word (e.g., "Jiajing" 713) with the associated sound from the microphone input of the user. Thus, the interactive pop-up window may be used in the additional learning mechanisms. The window may be shown when the editing of a target word is done, and the user may collect the user's feedback to facilitate the learning form the user's edits for continuous system improvements.

In such an example, if the list of alternatives or suggested words is not provided in certain system implementation, the proposed solution proceeds to another step that allows for manual entry, and thus to provide multiple methods to user to choose in order to input one or more words as the editing result. Any method (e.g., virtual-keyboard based text inputting, speech based inputting, finger/hand motion based inputting) that allows the user to input text word(s) and replace the target word (e.g. highlighted word) to edit with the inputted word(s) can be included into the system as one supported input method for user to choose. In one example, similar to the design shown in FIG. 7A, the system may support both the Coarse-n-Fine virtual keyboard based inputting method and the speech based input method the steps of FIG. 7C to let user input new word(s) to replace the target word to edit in the text sentence. Although in this example, as the system already enters the editing mode (e.g., the word to edit is already highlighted), the user may not need to look at the microphone icon to select the speech based input method. The system may automatically select the speech mode if (1) user's speech is detected from the microphone and (2) user is not conducting the virtual keyboard based inputting. The user can choose the virtual keyboard based input method by looking at the virtual keyboard region shown on the display of virtual/augmented reality device and use the virtual keyboard to input word(s). Thus, if alternatives or suggested words are provided but the list does not include the word that the user wants, the user may proceed to use whatever modality to edit the selected word. Thus in one embodiment, after the user selects a word to edit, the system will generate a list of alternative words for the user to choose in most cases (if not always). The user may or may not see the desired word in the list of suggested words. If that desired word is in the list, the user nay directly select that suggested word. Otherwise, if the list does not include the desired word, he user uses a preferred modality (virtual keyboard, speech, any modality, etc.) to input the desired word for editing.

The disclosure also allows for an alternative embodiment to support additional learning mechanism for selecting a suggested word. In such an embodiment, the learning mechanism may attempt to avoid the repetitive happening of a same system mistake (e.g., the ASR engine mistakenly recognizes one name into another for speech based text-inputting), with user's assistance through additional HMI (i.e., human-machine interaction) design. Such learning mechanism can be implemented with various machine learning algorithms. In such an embodiment, the system may utilize a learning strategy based on the type of each edited word, (1) with available environmental knowledge (e.g., contact names in the user's address book, emails, text messages, chat history, and/or browser history, time of day, day of the week, month, etc.) considered and (2) collecting user's confirmation from an additional HMI design when necessary. When the editing is completed for an input sentence, the system may first adopt a Named Entity Recognizer (NER) to detect the different types of names in the edited region of the sentence. For example, in the input sentence "send charging a message" (as shown in FIG. 7C) obtained by speech recognition (e.g., by the speech based inputting method), the user edited the speech recognition error "charging" into the correct name "Jiajing", and the NER may then identify "Jiajing" as a person name. Note the NER can be designed/trained to detect general names (e.g., person names, city names) and/or task-specific names (e.g., machine code) that are essential to the target application. Then, once a name is detected, the system may check whether the detected name is aligned with the environmental knowledge (e.g., whether a person name is included in the user's contact list). If this is true, the system may determine that such a name is important. Otherwise, the system may pop up a small interaction window (as shown in FIG. 7C) to ask the user whether such a name should be remembered. If the user answers yes, the name also will be deemed as important. Finally, for each name deemed as important (e.g., "Jiajing"), with the aid of its detected name type (e.g., person name), the system may proceed to update relevant models in the system (e.g., the language models involved in various input methods) to boost the chance that the name can be correctly inputted in the first step (e.g., inputting a text sentence) in future (e.g., boost the chance that "Jiajing" can be directly recognized by the speech based input method). The models to update can be stored on-premises or remotely in cloud or in a hybrid fashion, while the updating method can either directly modify model parameters (e.g., assigning "Jiajing" the same probabilities as "Jessica" in an n-gram language model) or modify the model output with a post-processing procedure (e.g., directly change "charging" to "jiajing" given appropriate context).

With all the given choices of input modalities in each step, the user may be allowed the freedom to choose a desired method for each step according to the usage scenario, making the maximization of system usability and text-inputting efficiency possible. Each modality (e.g., input interface) has its own advantage and disadvantages. For example, a speech-based input method is in general efficient, while it may not be able to work in highly noisy environment, it may fail to recognize unusual names/terms, and may not be suitable to input confidential message in public space. In the meanwhile, the virtual-keyboard based input method may be relatively less efficient, but it can handle the input of confidential messages as well as the input of unusual names and terms very well. With the freedom to choose various input modality, the user can thus choose the appropriate/suitable input/edit method based on the needs in each step in real application scenario. For instance, when privacy is not a concern and environment noises are low, the user may choose to use a speech input (e.g., microphone to input sentence by speech). In case that a speech recognition error (e.g., failing to recognize an unusual name like "Jiajing") happens, the user may edit the erroneous word by typing the correct word with the virtual keyboard, or any other input modality. In another instance, when privacy is a concern, the user may choose to use the virtual keyboard to input a sentence. In case that the user wants to correct or change a word in the inputted sentence, the user may edit the word by simply saying the desired word, especially if that word is not privacy sensitive. Note that the environment scenario may change from time to time through the use of a virtual/augment reality device. The disclosure below enables the user to always choose a suitable combination of input and editing methods to fit the user's needs and maximize the text-inputting efficiency under the specific usage circumstances.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system including a user interface, comprising:
a processor in communication with a display and at least one input interface, the processor programmed to:

output on the display the user interface including a keyboard layout, wherein the keyboard layout includes at least a keyboard includes a collection of characters;

in response to a first input from the at least one input interface, output a first portion of the keyboard layout associated with a first subset of characters of the keyboard layout, wherein the first subset does not include all of the characters and the keyboard layout is a staggered layout, wherein the first portion highlights the first subset of characters and shades-out all other characters of the keyboard in response to the first input from the at least one input interface, wherein shading out makes the characters unselectable;

in response to a second input from the at least one input interface, select a second subset of characters, wherein the second subset of characters is from and include less characters than the first subset of characters and the second subset includes two or more characters, wherein the second subset of characters tones down other characters from the second subset of characters in response to the second input from the at least one input interface;

and output a character on a text field associated with the user interface based on the selection of the second subset.

2. The system of claim 1, wherein the first input and second input are from different types of input interfaces.

3. The system of claim 1, wherein the processor is further programed to, in response to a third input from the at least one input interface, select and output a single selected character from the second subset of characters.

4. The system of claim 1, wherein the at least one input interface includes eye-gazing sensor, motion sensor, physiological sensors, biometric sensors, neuro sensor, brain wave monitor sensor, or a controller.

5. The system of claim 1, wherein the second subset of characters includes either three or four characters.

6. The system of claim 1, wherein the first portion of the keyboard layout is a grouping of one of three groups of characters, wherein each of the three groups associated each with a subset of different characters.

7. The system of claim 1, wherein the characters include letters, numbers, symbols, or words.

8. The system of claim 1, wherein the first input from the at least one input interface is associated with an eye tracking of a user of the user interface and the second input from the at least one input interface is associated with a hand-held controller.

9. The system of claim 1, wherein the second subset of characters overlaps partially with the first subset of characters.

10. The system of claim 1, wherein the user interface includes a text field section and a suggestion field section, wherein the suggestion field section is configured to output predicted words in response to contextual information associated with the user interface.

11. The system of claim 10, wherein based on receiving a selection of one of the predicted words, the one of the predicted words is output on the text field.

12. A virtual reality apparatus, comprising:
a display configured to output a user interface on the virtual reality apparatus;
an input interface;
a processor in communication with a display and the input interface, the processor programmed to:
output on the display the user interface including a keyboard layout, wherein the keyboard layout includes at least a keyboard includes a collection of characters;
in response to a first input from the input interface, highlight at the display a first portion of the keyboard layout associated with a first subset of characters of the keyboard layout, wherein the first subset does not include all of the character input, wherein the first portion highlights the first subset of characters and shades-out all other characters of the keyboard in response to the first input from the input interface, wherein shading out makes the characters unselectable;
in response to a second input from the input interface, highlight a second subset of characters, wherein the second subset of characters includes between two and four remaining characters from the first subset, wherein the second subset of characters tones down at least one character from the second subset of characters in response to the second input from the input interface;
and select and output at the display one of the characters of the second subset of characters.

13. The virtual reality apparatus of claim 12, wherein the selecting and outputting of the one of the characters of the second subset of characters is in response to a third selection from the input interface.

14. The virtual reality apparatus of claim 12, wherein outputting at the display includes outputting at a text field associated with the user interface.

15. A user interface programmed in a processor, comprising:
a text field section;
a suggestion field section, wherein the suggestion field section is configured to display predicted words in response to contextual information associated with the user interface;
a keyboard layout, wherein the keyboard layout includes at least a keyboard includes a collection of characters configured to display at the text field section in response to receiving input from at least one input interface;
wherein the user interface, when executed by the processor, is configured to:
in response to a first input from a first input interface, output a first portion of the keyboard layout associated with a first subset of characters of the keyboard layout and shade-out remaining characters from the collection of characters, wherein the first subset does not include all of the characters, wherein the first portion highlights the first subset of characters and shades-out all other characters of the keyboard in response to the first input from the first input interface, wherein shading out makes the characters unselectable;
in response to a second input from a second input interface, select and highlight a second subset of characters from the first portion and output one or more predicted words at the text field section, wherein the second subset of characters are from the first subset but does not include all of the characters of the first subset, wherein the second subset of characters tones down at least one character from the second subset of characters in response to the second input from the second input interface.

16. The user interface of claim 15, wherein the first input interface and the second input interface are both a same interface.

17. The user interface of claim 15, wherein the first portion of the keyboard layout includes no more than 9 characters.

18. The user interface of claim 15, wherein the first input interface, the second input interface, and the third input interface are different interfaces.

19. The user interface of claim 15, wherein the interface, when executed by the processor, is further configured to in response to a third selection from a third input interface, either i) select predicted words at the suggestion field section or ii) output a selected character from the second subset of characters.

* * * * *